UNITED STATES PATENT OFFICE.

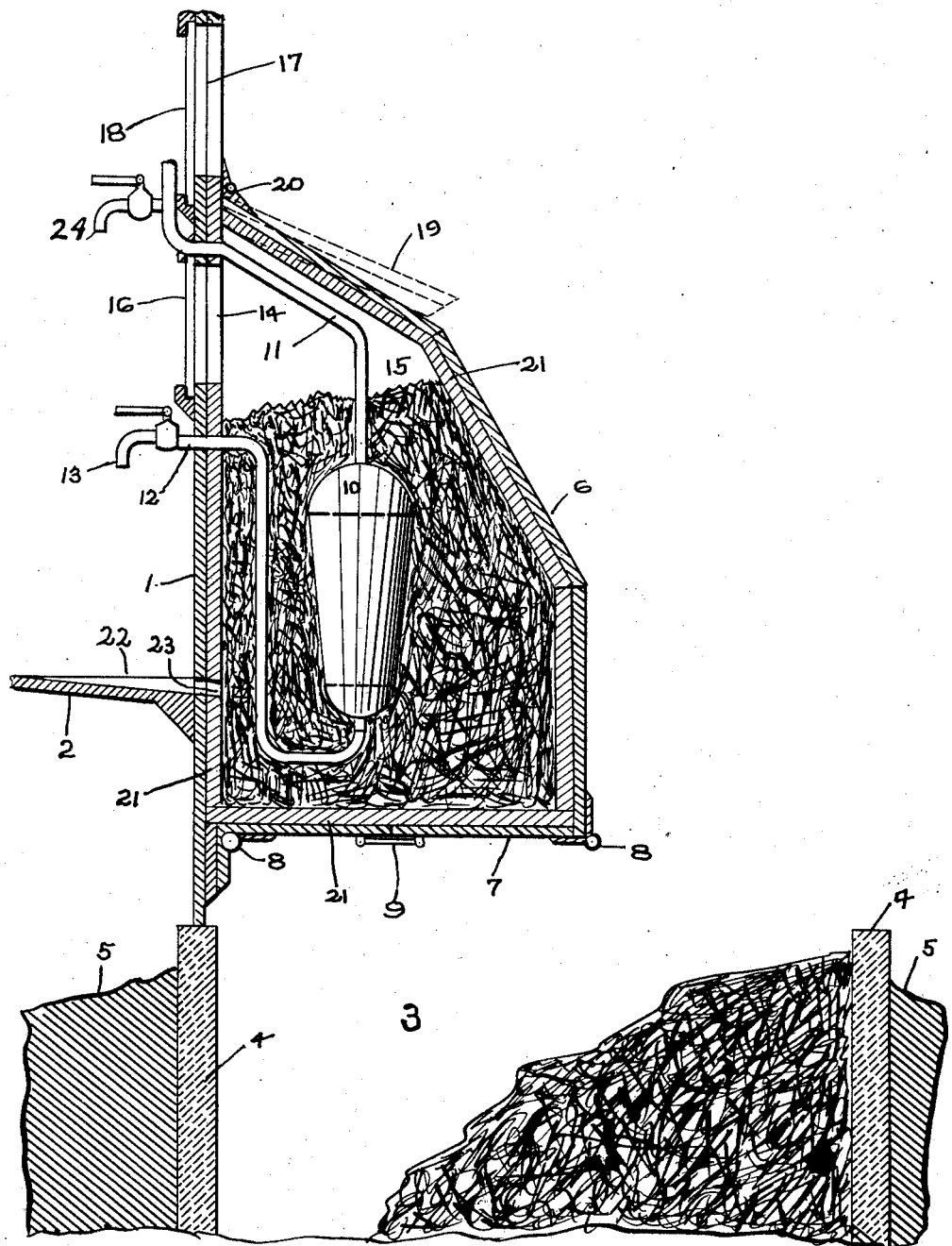

EMIL JACOBSON AND AARON WOLFF, OF SAN FRANCISCO, CALIFORNIA.

MEANS FOR HEATING WATER.

1,038,375.  Specification of Letters Patent.  Patented Sept. 10, 1912.

Application filed April 17, 1911. Serial No. 621,728.

*To all whom it may concern:*

Be it known that we, EMIL JACOBSON and AARON WOLFF, citizens of the United States, residing in the city and county of San Francisco, State of California, have invented certain new and useful Improvements in Means for Heating Water, whereof the following is a specification.

Our invention relates in a general way, to means for heating purposes and particularly water or other liquids and has for its object to provide a simple novel and inexpensive means whereby liquid can be quickly heated and maintained at a comparatively constant degree of heat.

To carry out our invention in practice we construct a box or casing and secure the same preferably to the side of a barn below the floor thereof, that being for the purpose of this application, a suitable place to illustrate the object we have in view. In the central portion of the casing we place a closed tank and provide at one end thereof an inlet connected to the source of liquid supply and at the other end an outlet projecting inside of the barn or other place if desired, and secure thereon a faucet by which the liquid entering the tank is drawn off, and then fill the casing with substance or matter capable of fermenting thereby generating heat by which the liquid in the tank is heated. When the fermentation begins to relax the contents of the casing may be dumped into a pit or other suitable receptacle below, through a trap door provided for at the bottom of the casing and the same refilled with fresh fermentable matter through a suitable opening in the casing or in the wall of the barn communicating with the interior of the casing.

Other means employed in conjunction with the above mentioned parts of our invention and their combinations and arrangements will be hereinafter detailed in the following description and particularly set forth in the claims at the end hereof.

The accompanying drawings consisting of one sheet forming a part of this application represents a vertical central sectional view of our heating device as it appears in operative position on the wall of a barn and shows also the pit in which the manure from the barn or the fermented matters from the heating device may be dumped and carried away.

Similar characters of reference denote similar parts in the drawing, in which—

1, represents the side of the barn, 2, the floor thereof and 3, manure pit having concrete wall 4 set in the ground 5 as shown, or above it if desired, all of which are of the well known construction and need no further description.

Mounted on the wall of the barn above the pit is our heating device consisting of a box or receptacle 6 projecting below the floor 2 of the barn and provided with the trap door 7 hinged at 8 and locked in position by a suitable latch 9. Within the receptacle is the tank 10, one end of which is connected to the source of liquid supply by means of pipe 11, which constitute the inlet of the tank, and the source of liquid supply may be from the water main or suitable tank set up above the receptacle (not shown). At the opposite end of the tank is pipe 12 provided with faucet 13 and which constitute the outlet of the tank. This faucet 13 is arranged above the gutter 22, so that heated water may be admitted therefrom into the gutter whence it is conveyed through the inlet 23, for accelerating the fermentation of the fermentable matter.

In the wall of the barn is an aperture 14 communicating with the interior of the receptacle 6 at its upper part and through which fermentable matters 15 are conveyed therein in such a manner to completely submerge the tank 10 and as much of the inlet and outlet pipes respectively 11 and 12 above mentioned as may be possible, and the aperture just mentioned is provided with shutter 16 to close the same and thus keep out the smell from the receptacle during the progress of fermentation. The fermentable matter 15 may consist of chemical compound, manure or other organic substances, etc., such however that may be susceptible of the longest fermentation.

As shown in the drawing the tank 10 is mounted vertically in the casing, in this case its downward end is preferably tapered to allow the fermented matters to slide freely down through the trap door 7 into the pit as above mentioned and therefrom carried away.

Above the receptacle in the wall of the barn is a window 17 provided with shutter 18 and through which manure or other matter from the barn may be pitched over the outer sloping wall of the casing into the pit 3 below.

The receptacle 6 is provided with a cover 19 hinged as at 20 thereon or at any other convenient place if desired and is intended to be used for various purposes such as for instance, to fill the casing with fermentable matter or expose same to the air if necessary to carry on the fermentation or otherwise.

The inner surrounding walls of the receptacle and that portion of the barn connected therewith are provided with packing 21 and on the floor 2 of the barn is a gutter 22 communicating with the interior of the receptacle through the aperture 23 carrying therein the animal fluid for the purpose of assisting the fermentation.

At a suitable place along the inlet pipe 11 the faucet 24 may be secured for the purpose of drawing out cold water directly from the source of supply.

Believing we have produced novel and useful improvements in the art to which our invention appertains and having described the same what we claim and desire to secure by Letters Patent of the United States is:—

1. A water heating device comprising a receptacle adapted to contain fermentable matter, a water tank in the receptacle, means through which water is admitted to the tank, means through which water is drawn from the tank, said receptacle having means through which matter may be introduced and having an elevated and movable bottom which is therefore adapted for dumping the matter from the receptacle.

2. A water heating device comprising a receptacle adapted to contain fermentable matter, an elongated downwardly tapering water tank in the receptacle, supply means and discharge means connected with the tank, said receptacle having a supply aperture therein, and said receptacle having a hinged bottom whereby and because of the downward taper of said tank the decomposing matter may freely slide from the receptacle substantially as described.

3. In combination with a wall of a building, a receptacle juxtaposed to the wall, a tank in the receptacle, liquid supply means and liquid outlet means connected with the tank, said wall having an aperture through which solid fermentable matter may be introduced into the receptacle, and means for admitting liquid fermenting material into the receptacle.

4. In combination with a wall of a building, a receptacle juxtaposed to the wall, a tank in the middle portion of the receptacle, liquid supply means and liquid outlet means connected with the tank, a door communicating with the interior of the receptacle through which solid fermentable material may be introduced into the portion of the receptacle nearest the wall, means for admitting liquid fermenting material into the receptacle, said wall having a second door over the first said door, and means correlated with the second door for receiving and delivering said material to the portion of the receptacle farthest from the wall.

5. In a heating device, a stable floor, a stable wall, a fermentation receptacle on the outer side of said wall extending below the level of said floor, a drain along said floor and entering into said receptacle, a closable window through said wall between said stable and said receptacle a water tank located inside said receptacle and inlet and outlet pipes connected with said water tank.

6. In a heating device, a stable floor, a stable wall, a fermentation receptacle against the outer side of said wall, a closable window through said wall and communicating with said receptacle for the introduction of fermentable matter into said receptacle, a water tank in said receptacle, inlet and outlet pipes connected with said water tank, a pit below said receptacle, and a trap door in the bottom of said receptacle for allowing the fermented matter to slide from the receptacle into the pit.

7. In combination, a stable floor having a gutter, a stable wall having an outlet-port communicating with the gutter and having a door above the gutter, a receptacle for fermentable matter against the exterior of the wall and in communication with said door and said outlet, a tank in the receptacle and provided with an inlet pipe and an outlet pipe, and a faucet on the outlet pipe over the gutter for admitting heated water from the tank therethrough and through the gutter and outlet-port into said receptacle and fermentable matter.

In testimony that we claim the foregoing we have hereto set our hands in the presence of witnesses, this 11th day of April, 1911.

EMIL JACOBSON
AARON WOLFF

Witnesses:
BLANCHE C. CHESTER,
D. B. RICHARDS.

---

Copies of this patent may be obtained for five cents each, by addressing the "Commissioner of Patents, Washington, D. C."